United States Patent [19]

Keldany

[11] Patent Number: 5,275,442
[45] Date of Patent: Jan. 4, 1994

[54] CONNECTING ELEMENT

[75] Inventor: Rachid Keldany, Maur, Switzerland

[73] Assignee: Ametex AG, Niederurnen, Switzerland

[21] Appl. No.: 777,534

[22] Filed: Jan. 28, 1992

[51] Int. Cl.⁵ .......................................... F16L 55/124
[52] U.S. Cl. ........................................ 285/55; 285/97; 285/162; 285/294
[58] Field of Search ............... 285/107, 109, 97, 138, 285/156, 197, 162, 146, 338, 294, 297, 55

[56]         References Cited
       U.S. PATENT DOCUMENTS

| | | | |
|---|---|---|---|
| 1,836,470 | 12/1931 | Humason et al. | 285/97 X |
| 2,504,025 | 4/1950 | Humason | 285/97 |
| 4,630,648 | 12/1986 | McCord | 285/97 X |
| 4,772,050 | 9/1988 | Buehler et al. | 285/107 X |

FOREIGN PATENT DOCUMENTS

| | | | |
|---|---|---|---|
| 459687 | 9/1968 | Switzerland | 285/97 |
| 8204086 | 11/1982 | World Int. Prop. O. | 285/97 |

Primary Examiner—Dave W. Arola
Attorney, Agent, or Firm—Nies, Kurz, Bergert & Tamburro

[57]          ABSTRACT

A connecting element including an annular sleeve that has a self-supporting inner wall and a flexible outer wall, and a space between the inner and outer walls for introducing a preferably hardenable free-flowing filling medium into the connecting element to expand the connecting element radially outwardly to contact surfaces of adjacent pipe structures. A feed opening is provided in one of the inner wall and the outer wall to provide access to the space between the walls to permit introduction of the filler material. The connecting element is particularly suitable for sealing the joint between a multi-walled main pipe and a branch pipe extending from the main pipe.

9 Claims, 2 Drawing Sheets

CONNECTING ELEMENT

BACKGROUND OF THE INVENTION

1. Field of the Invention

The present invention relates to a connecting element, specifically for sealing the gap between the wall of an outer pipe to which a branch pipe is connected and the wall of an inner liner pipe, at a branch opening extending through both inner and outer pipe walls.

2. Description of the Related Art

Pipe conduits which are in need of repair are nowadays increasingly restored or repaired in that a cladding in the form of a further pipe of a somewhat lesser diameter is inserted into the pipe conduit. This pipe shaped cladding ("liner") is inserted by means of recently developed techniques. It is necessary that the cladding must be provided after its insertion with suitable opening at those places where branch pipes are present with corresponding openings. Because the pipe conduits are generally not such opening are made by means of apparatuses which can travel through the pipe and are equipped with remote controlled cutting tools (roboter).

There is now the task to bridge or close off in a sealed manner the gap at the areas of connection between the branch pipes and the pipe wall of the later inserted inner pipe, which gap is present at every through opening between the inner and the outer pipe wall, such that on the one hand the contents of the pipe can not enter into the interstice between inner wall and outer wall and, in case that interstice is filled by material for a stabilizing (e.g. settable cement mortar) this filling material can not exit into the pipe.

It in fact is known to insert ring shaped hoses between two concentric pipes and to expand them in order to therewith provide a seal. Due to structural reasons these elements are not suitable for solving the present problem, among others because such an element could not be inserted at the desired location by the available apparatuses.

A known solution consisted of a sleeve of a rubber elastic material which can place itself onto the areas to be sealed due to its elasticity. The drawback of this which is shown in FIG. 2 of the drawings consists in that the element must be produced extremely precisely in order to display the desired effect. In spite of the elasticity of the element tolerances can be taken only within narrow limits. Additionally, the sealing effect would be nullified under the pressure of the filled in material in the interstice of the pipe.

SUMMARY OF THE INVENTION

The task is solved in an easy way due to the inventive connecting element. According to the invention the connecting element is characterized by the ring shaped sleeve which upon a feeding of a preferably hardenable, flowable medium into the space between an inner and an outer wall, is deformable in a radially outward direction, and which includes at least one feed opening for the filling medium.

In a specifically advantageous embodiment the ring shaped sleeve includes a relatively form stable or possibly elastically bendable pipe shaped inner section, on the outside of which a jacket wall is mounted which is expandable to a limited extend under the influence of an injected filling medium, such as a settable resin. The material of the jacket should be extraordinarily pliable such that upon deforming it places itself sealingly onto the surfaces of the opposite structural elements and partly grips around the walls and similar objects. The jacket can be formed from an elastic material or be structured in a bellows like fashion.

Preferably, the space between the inner and outer wall of the expandable sleeve is divided by partitions which are destructable under predetermined inner pressure (pressure of the filling medium), into several compartments such that the compartments can be made to expand sequentially.

Below, the invention is explained in more detailed based on the drawing.

DESCRIPTION OF THE PREFERRED EMBODIMENTS

Figure 1:
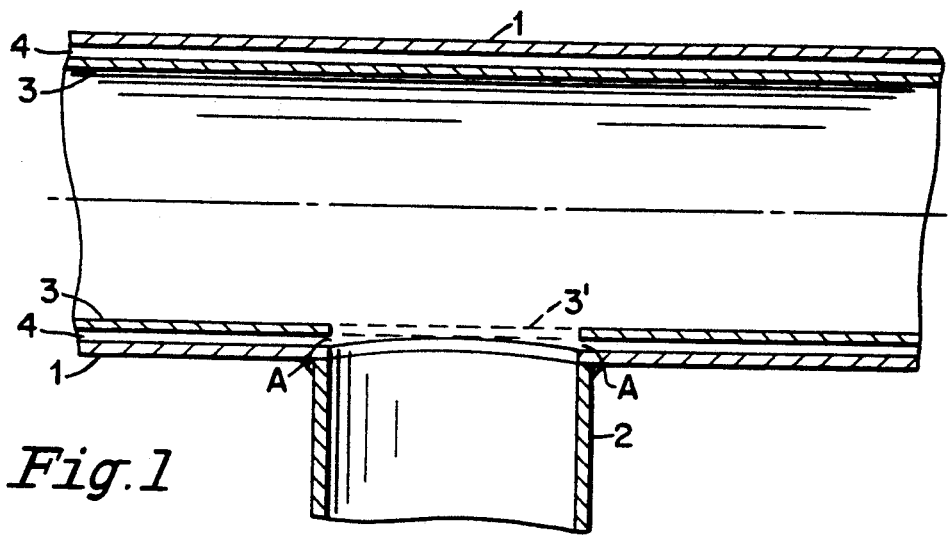
FIG. 1 of the drawing illustrates purely schematically a cut-out of a pipe conduit with a branch pipe which is equipped with a inner cladding ("liner") forming a double wall.

FIG. 1 of the drawing illustrates purely schematically a pipe conduit 1 with a branch pipe 2 (e.g. a feeder conduit) whereby the pipe conduit 1 is clad by an inserted liner pipe 3 inserted. The liner pipe 3 serves for repairing of the pipe conduit 1 and is inserted by means of common techniques. The outer diameter of the liner pipe 3 is somewhat smaller than the inner diameter of the pipe 1.

The interstice 4 between the pipes 1 and 3 is filled for stabilizing preferably by the injection of a setting material (e.g. cement mortar). By means of a remote controlled apparatus (roboter) the wall of the inner pipe 3 is broken out or cut out at the location 3' which has been determined earlier to form the communication to the branch pipe 2. Because the pipe 2 is only connected, e.g. welded to the wall of the pipe 1 the gap 4 is open at the locations A. These locations A must be bridged in a sealed manner or be closed off such that the contents of the pipes 1 and 2 can not enter the interstice 4, and so that an injected medium brought possibly into the insterstice 4 cannot flow out at the locations A.

Figure 2:
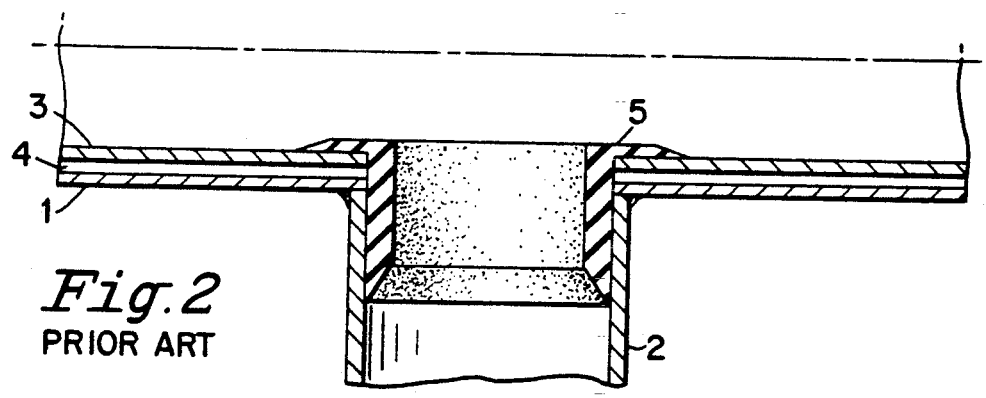
FIG. 2 illustrates a common bridging or sealing, resp. of the joint area between main pipe conduit, cladding and branch pipe.

FIG. 2 of the drawings illustrates how the mentioned connection area has until now been sealed. For this task a plug 5 of a rubber elastic material is inserted,. into the connection area (for instance by pulling it into the pipe 2) For several reasons this solution is not satisfactory : On the one hand the plugs 5 must be dimensioned precisely in order to assure sealing. On the other hand this seal would be disrupted upon the infeeding of an injection mass into the interstice 4 because of the elasticity of the plug.

Figure 3:
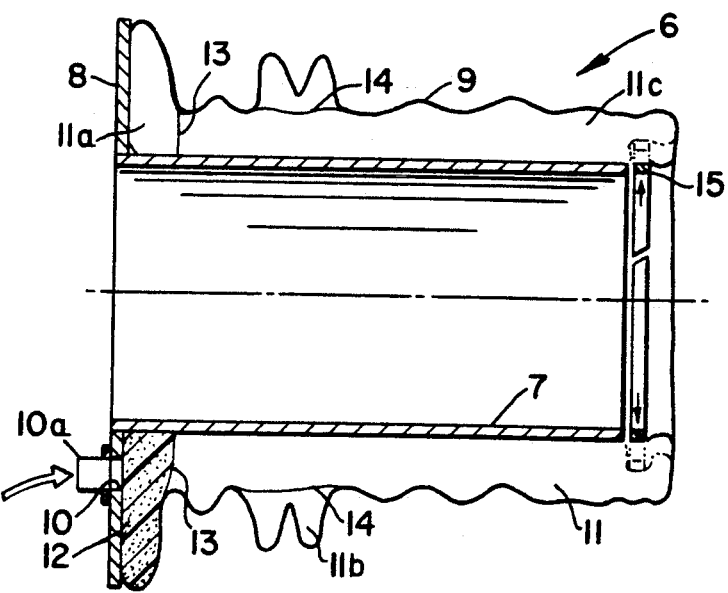
FIG. 3 illustrates an embodiment of an inventive connecting element.

FIG. 3 of the drawings illustrates a connecting element 6 in accordance with the present invention is in the form. It of a sleeve with an inner wall 7 of a relatively form stable or elastically bendable self foreseen material, e.g. of a hard rubber-or plastic material, with a radial flange 8 at one end and a bellows like jacket wall 9 (outer wall) of an easily deformable material at the outer side of the inner wall 7. Through a feed opening 10 provided in the inner wall 7 or in the flange 8 which preferably includes a valve 10a the inner space 11 of the connecting element 6 structured in this manner can be expanded by introducing through feed opening 10 a preferably settable filling medium 12. The inner space 11 of the connecting element 6 is partitioned, for instance by partitions 13, 14, into three compartments 11a, 11b and 11c. The partitions 13, 14 are destructable at a predetermined inner pressure caused by the filling medium 12 such that the compartments 11a, 11b and 11c expand subsequently whereby the jacket wall 9 comes to tightly lie against the contours of the elements of the connection and thereafter the connecting element sets (a settable synthetic resin is suitable as filling medium).

Figure 4:
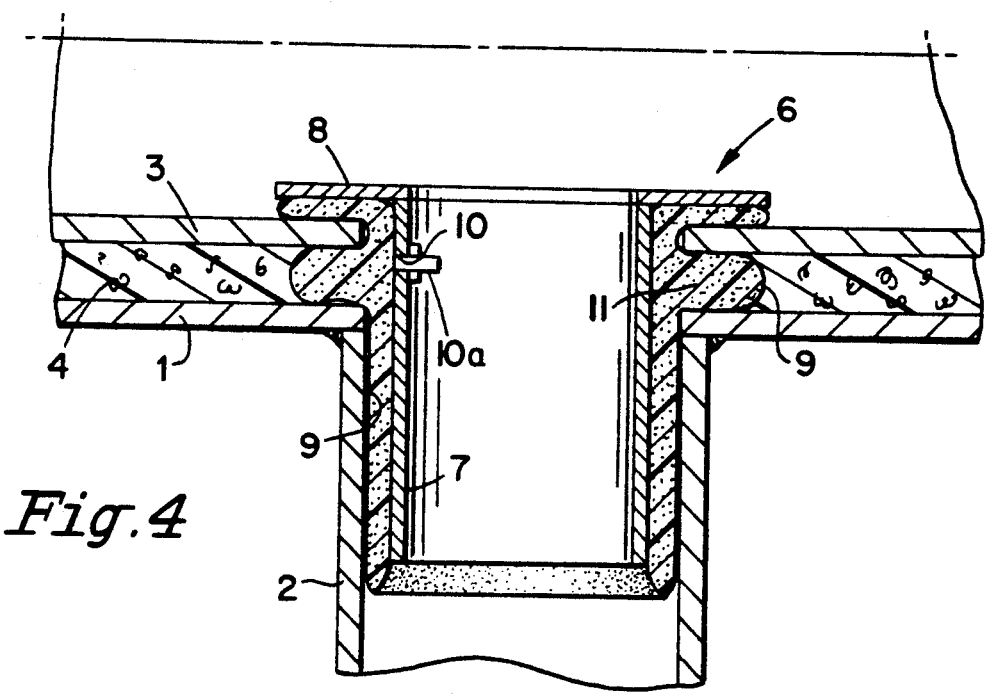
FIGS. 4 and 5 are views similar to FIG. 2 with an inventive connecting element at the location of the pipe branch.
Figure 5:
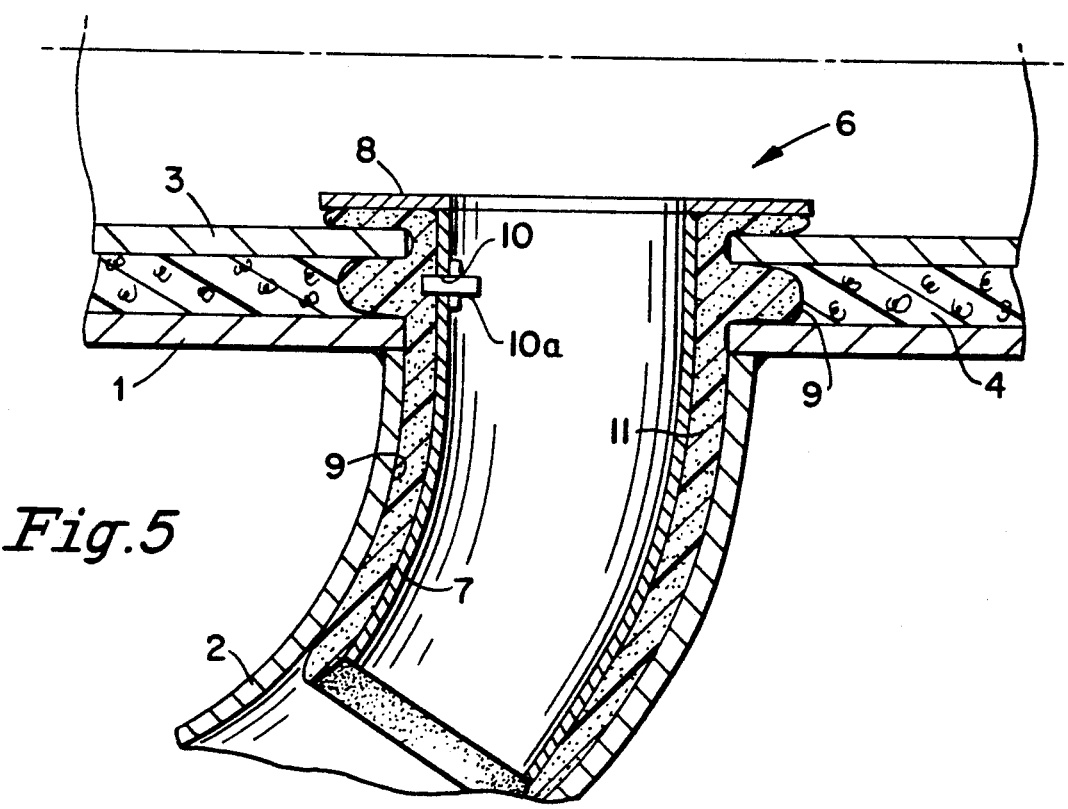

FIGS. 4 and 5 of the drawings illustrate inserted, expanded connecting elements 6. It can be seen therefrom that it is possible to produce a tight seal at the pipe connection are by means of the inventive connecting element, regardless of whether the branch pipe 2 leads perpendicularly or at an arbitrary angle away from the main pipe 1.

FIG. 3 illustrates that it is possible to provide at the end of the connecting element 6 which is to be inserted into the branch pipe, mechanical spreading elements which can be released at a predetermined time (after the inserting of the element, but after the expanding of the jacket wall) in order to place the end of the connecting element 6 in a sealed manner against the inner wall of the pipe branch.

The spreading elements can include a spreadable, possibly under its own spring force, spreader ring 15. The spreader ring 15 can be mounted in a suitable manner on the sleeve 7 or on the jacket wall 9.

What is claimed is:

1. A connecting element for sealing a gap at a connection between a conduit pipe ad a branch pipe extending laterally from the conduit pipe, the conduit pipe having an inner liner pipe therewithin, the gap defined by a space between the conduit pipe and the liner pipe, said connecting element comprising a sleeve having a self-supporting inner wall and a flexible outer wall, the outer wall connected with the inner wall at spaced areas to define an inner space between the inner and outer walls, one of the inner wall and the outer wall including a feed opening to provide access to the inner space so that a flowable filler material can be introduced through the feed opening and into the inner space to radially expand the flexible outer wall into said gap to sealingly contact said conduit and liner pipe into which the connecting element is placed.

2. A connecting element according to claim 1, wherein the sleeve inner wall is elastically bendable.

3. A connecting element according to claim 1, wherein the inner wall includes a flange at one end.

4. A connecting element according to claim 1, including spaced partitions positioned within the inner space and extending between the inner and outer walls to define a plurality of expandable compartments.

5. A connecting element according to claim 1, wherein the feed opening includes a valve for regulating flow of material into and out of the inner space.

6. A connecting element according to claim 1, wherein the outer wall is formed as a bellows.

7. A connecting element according to claim 1, including radially movable spreading means carried by the sleeve for radially urging the sleeve outer wall into contacting engagement with an inner surface of the branch pipe in order to seal the connecting element to the inner surface of the branch pipe.

8. A connecting element according to claim 7, wherein the spreading means includes an elastically expandable spreading ring.

9. A connecting element in accordance with claim 7 wherein the spreading means includes a radially outwardly spring biased spreader ring.

* * * * *